United States Patent [19]
Oyamada et al.

[11] 4,128,518
[45] Dec. 5, 1978

[54] PRESSURE-SENSITIVE ADHESIVE AND VINYL ACETATE-ETHYLENE COPOLYMER EMULSION USEFUL AS BASE MATERIAL THEREFOR

[75] Inventors: Takeo Oyamada; Choji Tomizawa, both of Ichihara; Masahiro Domoto, Toyonaka; Shizuo Narisawa, Ichihara, all of Japan

[73] Assignee: Sumitomo Chemical Company, Limited, Osaka, Japan

[21] Appl. No.: 789,293

[22] Filed: Apr. 20, 1977

[30] Foreign Application Priority Data

Apr. 28, 1976 [JP] Japan .................................. 51-48734

[51] Int. Cl.$^2$ ............................................. C08L 23/04
[52] U.S. Cl. .................. 260/29.6 WB; 260/29.6 ME; 260/29.6 E; 260/29.6 T; 260/29.6 R; 260/29.6 TA; 260/29.6 RB; 428/523
[58] Field of Search .................. 260/29.6 ME, 29.6 E, 260/29.6 R, 29.6 T, 29.6 TA, 29.6 RB, 29.6 RW, 17 A

[56] References Cited

U.S. PATENT DOCUMENTS

| 3,404,113 | 10/1968 | Lindemann et al. | 260/29.6 ME |
|---|---|---|---|
| 3,440,200 | 4/1969 | Lindemann et al. | 260/29.6 ME |
| 3,457,209 | 7/1969 | Mikofalery | 260/29.6 TA |
| 3,475,363 | 10/1969 | Gauder | 260/29.6 H |
| 3,637,428 | 1/1972 | Aleckner, Jr. | 428/516 |
| 3,637,615 | 1/1972 | Coffman | 260/29.6 TA |
| 3,671,382 | 6/1972 | Pierce | 260/29.6 RW |
| 3,692,723 | 9/1972 | Kasagi et al. | 260/29.6 ME |
| 3,707,518 | 12/1972 | Bemmels et al. | 260/29.6 TA |
| 3,708,388 | 1/1973 | Lindemann et al. | 428/520 |
| 3,806,484 | 4/1974 | Dargan | 260/29.6 RW |

Primary Examiner—Melvyn I. Marquis
Attorney, Agent, or Firm—Birch, Stewart, Kolasch and Birch

[57] ABSTRACT

A pressure-sensitive adhesive containing a base material therefore comprising an aqueous emulsion of vinyl acetate-ethylene copolymer having an ethylene content of 15 to 40% by weight, preferably 20 to 35% by weight, the benzene-insoluble part of less than 30% by weight, preferably less than 20% by weight, and an intrinsic viscosity of the benzene-soluble part of 0.4 to 1.4 dl/g, preferably 0.6 to 1.0 dl/g, (at 30° C) which is prepared by the emulsion copolymerization of vinyl acetate and ethylene and optionally at least one unsaturated monovinyl monomer in the presence of a protective colloid and a polyoxyethylenic nonionic sulfactant, or a base material comprising a blend of said aqueous emulsion of vinyl acetate-ethylene copolymer as set forth above and an emulsion of an acrylic ester copolymer; and the aqueous emulsion of vinyl acetate-ethylene copolymer useful as the base material for the pressure-sensitive adhesive.

6 Claims, No Drawings

PRESSURE-SENSITIVE ADHESIVE AND VINYL ACETATE-ETHYLENE COPOLYMER EMULSION USEFUL AS BASE MATERIAL THEREFOR

The present invention relates to a pressure-sensitive adhesive containing an emulsion of a vinyl acetate-ethylene copolymer, and the emulsion useful as a base material for a pressure-sensitive adhesive.

More particularly, it relates to an aqueous emulsion of vinyl acetate-ethylene copolymer, which shows excellent aging resistance, heat stability, light stability and further excellent balance in tackiness, cohesiveness and adhesion without undesirable loss of tackiness, denature, decoloring during storage for a long period of time or undesirable corrosion of the material to be adhered, and hence, is useful as a base material for a pressure-sensitive adhesive composition used as a pressure-sensitive adhesive label or pressure-sensitive adhesive sheet for various plastic bases, particularly for polyolefinic resin base. The base material for a pressure-sensitive adhesive in the present invention does not show undesirable dirt of the surface of material to be adhered due to the remaining of the adhesive composition when the pressure-sensitive adhesive label or sheet is peeled off, and further is excellent from the viewpoint of the prevention of disasters because it is an aqueous emulsion and hence no organic solvent is used for the preparation of the adhesive composition.

Although there has hitherto been used a solvent type pressure-sensitive adhesive containing a synthetic rubber as the base material for the adhesive composition, it has various defects, such as bad smell, danger of fire, bad safety and health in labor, aging, coloring and further dirt of the surface of material to be adhered when the adhesive is peeled off, because an organic solvent is used. Recently, an emulsion of an acrylic ester copolymer has been used, because it is an aqueous emulsion and is more excellent in the aging resistance and colorability than the synthetic rubber. However, the emulsion of acrylic ester copolymer is unfavorably inferior in the adhesion to the polyolefinic resin base.

Besides, some emulsions of vinyl acetate-ethylene copolymer have been widely used for various adhesives because they have not bad smell and have excellent aging resistance and weatherability and further can be used for wide range of materials to be adhered. However, the properties to be required for the emulsion are variable according to the kinds of adhesives and the processing processes thereof, and hence, it is studied to develop various emulsions of vinyl acetate-ethylene copolymer having the most suitable properties for each adhesive and processing process, but the conventional emulsions of vinyl acetate-ethylene copolymer have not sufficiently excellent properties suitable as a base material for pressure-senstive adhesive.

For instance, it is described in "Kobunshi kako, Annex V, Ethylene-Vinyl Acetate Copolymer Resin", pages 143-149, issued by Kobunshi Kankokai on Aug. 10, 1969 that when ethylene is copolymerized with vinyl acetate, the pressure-sensitive adhesion of the copolymer to metal foils and various plastic films other than polyolefinic film is increased with the increase of the content of ethylene, and hence it is suitable as an adhesive for laminate products. Furthermore, French Patent No. 1,564,100 describes emulsions of a high molecular weight vinyl acetate-ethylene copolymer having an ethylene content of 15% by weight or more and an intrinsic viscosity of 1.0-2.5 dl/g (in benzene, at 30° C.). Besides, Japanese Patent Publication No. 36259/1975 describes emulsions of a high molecular weight vinyl acetate-ethylene copolymer having an ethylene content of 17% by weight or more and a relative viscosity of 5.6 or more which are useful as an adhesive.

However, these known vinyl acetate-ethylene copolymer emulsions are mainly developed as an adhesive and these literatures do not teach the balancing of tackiness, cohesiveness and adhesion which is required for the base material for a pressure-sensitive adhesive. When these emulsions are used as the base material for a pressure-sensitive adhesive, they are inferior in the pressure-sensitive adhesion, particularly in the adhesion to polyolefinic film, and show occasionally an undesirable coloring by heat and an inferior water resistance. In order to eliminate these defects, some adhesive auxiliarys, adhesive improvers or the like have been incorporated, but it has never been studied to improve the emulsion of vinyl acetate-ethylene copolymer itself. For instance, Japanese Patent Laid Open Publication (without examination) No. 124137/1974 describes a pressure-sensitive adhesive comprising a vinyl acetate-ethylene copolymer emulsion having an ethylene content of 10 to 50% by weight (as the base material for a pressure-sensitive adhesive), an adhesive auxiliary and also a diepoxide compound in order to improve the adhesive force, it does not define or specify the properties of the vinyl acetate-ethylene copolymer emulsion.

It is also known that some vinyl acetate-ethylene copolymers are used as a base material for a pressure-sensitive adhesive. For instance, there are known a solvent type, pressure-sensitive adhesive comprising a vinyl acetate-ethylene copolymer having an ethylene content of 60 to 85% by weight and a specific viscosity of 0.45 to 1.50 (in a concentration of 0.25% by weight in toluene, at 30° C.) and a tackifier or a plasticizer which are dissolved in toluene or carbon tetrachloride (cf. Japanese Patent Publication Nos. 17165/1963 and 17166/1963), and a solvent type, pressure-sensitive adhesive comprising a vinyl acetate-ethylene copolymer having an ethylene content of 15 to 50% by weight and a specific viscosity of 0.03 to 0.20 (in a concentration of 0.4% by weight in toluene, at 30° C.) and a vinyl acetate-vinyl chloride copolymer which are dissolved in a mixed solvent of toluene-acetone (cf. Japanese Patent Publication No. 8118/1971). However, these solvent type, pressure-sensitive adhesives have various defects, such as bad smell, danger of fire, bad safety and health in labor and further dirt or corrosion of the surface of material to be adhered, because an organic solvent is used, as mentioned above. Even if the vinyl acetate-ethylene copolymer described in Japanese Patent Publication Nos. 17165/1963 and 17166/1963 is emulsified in the same manner as in the present invention, it is still inferior in the tackiness and does not show balanced properties as required in a pressure-sensitive adhesive because of too high ethylene content thereof. Besides, even if the vinyl acetate-ethylene copolymer as described in Japanese Patent Publication No. 8118/1971 is emulsified in the same manner as in the present invention, it is still inferior in the cohesiveness and adhesion properties and does not show balanced properties as required in a pressure-sensitive adhesive because of too lower molecular weight thereof.

The present inventors have intensively studied on the components of the vinyl acetate-ethylene copolymer, molecular weight and micro-structure thereof and further the dispersing agent used in the emulsion polymerization reaction and other factors in order to obtain an emulsion of vinyl acetate-ethylene copolymer which shows well balanced properties in the tackiness, cohesiveness and adhesion, that is, can easily flow and adhere with an optional and light pressure (e.g. finger pressure) and shows sufficient adhesion force resistant to an external force to a certain extent without undesirable dirt and injure of the surface of the material to be adhered when peeled off, and further shows excellent heat resistance, colorability, water resistance and adhesion stability.

As the results, it has been found that when the vinyl acetate and ethylene are emulsion-copolymerized in the presence of a nonionic dispersing agent, the vinyl acetate-ethylene copolymer emulsion contains an ethylene content of 15 to 40% by weight, less than 30% by weight of benzene-insoluble part, a micro-structure of smaller content of graft compound and fewer three-dimensional structure and has a comparatively lower molecular weight, i.e. the benzene-soluble part has an intrinsic viscosity of 0.4 to 1.4 dl/g (at 30° C.) and has excellent properties as required in a pressure-sensitive adhesive as mentioned above.

The present invention provides an emulsion of vinyl acetate-ethylene copolymer useful as a base material for a pressure-sensitive adhesive, which is prepared by emulsion polymerization of vinyl acetate and ethylene in the presence of a nonionic dispersing agent, and has an ethylene content of 15 to 40% by weight and contains a benzene-insoluble part of less than 30% by weight and further has an intrinsic viscosity of the benzene-soluble part of 0.4 to 1.4 dl/g (at 30° C.).

The vinyl acetate-ethylene copolymer has an ethylene content of 15 to 40% by weight, preferably 20 to 35% by weight, and a vinyl acetate content of 60 to 85% by weight, preferably 65 to 80% by weight. When the ethylene content is less than 15% by weight, the pressure-sensitive adhesive prepared therefrom is hard and has inferior fluidity and further inferior tackiness and adhesion force. On the other hand, when the ethylene content is over 40% by weight, the crystallizability of ethylene appears and hence the pressure-sensitive adhesive is hard and has inferior tackiness and adhesion force, too.

The copolymer of the present invention should contain less than 30% by weight, preferably less than 20% by weight, of benzene-insoluble part when it is dissolved in benzene. When the benzene-insoluble part is contained in an amount of more than 30% by weight, the pressure-sensitive adhesive prepared therefrom has an inferior fluidity and further inferior tackiness and adhesion force, which may be due to too large cohesive force of the copolymer.

The benzene-soluble part of the present copolymer should have an intrinsic viscosity of 0.4 to 1.4 dl/g, preferably 0.6 to 1.0 dl/g, at 30° C.). When the intrinsic viscosity is less than 0.4 dl/g, the pressure-sensitive adhesive prepared therefrom has an inferior cohesive force and hence the pressure-sensitive adhesive tape or sheet will be easily peeled off only by a slight force and gives undesirable dirt onto the surface of the material to be adhered. Moreover, owing to too high fluidity, when the pressure-sensitive adhesive is applied, the components of the adhesive is flowed out. When the intrinsic viscosity is over 1.4 dl/g, the copolymer shows too high cohesive force, and hence, the pressure-sensitive adhesive prepared therefrom shows inferior tackiness and adhesion force.

In the present invention, a nonionic dispersing agent is used as the dispersing agent in the emulsion polymerization reaction of vinyl acetate and ethylene, wherein various nonionic surfactants are used as an emulsifier and various nonionic water-soluble high molecular compounds are used as a protective colloid. When an anionic surfactant, such as sodium vinylsulfonate, sodium dodecylbenzenesulfonate or sodium laurylsulfonate, is used together in the emulsion polymerization reaction, the copolymer thus obtained tends to color in yellow with the lapse of time, which is significant when heated, and is a fatal defect for the pressure-sensitive adhesive because the clarity is essential for the pressure-sensitive adhesive. Moreover, the copolymer is inferior in the water resistance, and hence, tends to be inferior in the adhesion stability at a moist atmosphere.

The polyoxyethylenic nonionic surfactant used in the present invention includes polyoxyethylene alkyl ethers and polyoxyethylene alkylphenol ethers (e.g. polyoxyethylene lauryl ether, polyoxyethylene octylphenol ether, polyoxyethylene nonylphenol ether), polyoxyethylene sorbitan fatty acid esters (e.g. polyoxyethylene sorbitan monolaurate, polyoxyethylene sorbitan monooleate), polyoxyethylene-polyoxypropylene block copolymers having an ethylene oxide addition amount of 10 to 80 mol %, or the like. Preferably, the polyoxyethylenic nonionic surfactant has an H.L.b. value of 5 to 20. The polyoxyethylenic nonionic surfactant may usually be used in an amount of 1 to 8% by weight based on the total weight of the monomers.

The nonionic water-soluble high molecular compound used as a protective colloid in the present invention includes a polyvinyl alcohol, a partially hydrolyzed polyvinyl alcohol having a saponification degree of at least 60 mole % and a degree of polymerization of 300 to 2,700, cellulose derivatives (e.g. methyl cellulose, ethyl cellulose, hydroxyethyl cellulose, carboxymethyl cellulose), or the like. The nonionic water-soluble high molecular compound may usually be used in an amount of 0.1 to 1% by weight based on the total weight of the monomers.

The vinyl acetate-ethylene copolymer of the present invention includes also so-called, crosslinked type vinyl acetate-ethylene copolymer emulsion which is obtained by emulsion polymerization of an unsaturated monovinyl monomer having a functional group together with the vinyl acetate monomer and ethylene monomer. The crosslinked type vinyl acetate-ethylene copolymer emulsion is particularly useful for the preparation of a pressure-sensitive adhesive which requires a high heat resistance and a low heat-sensitivity.

The unsaturated monovinyl monomer having a functional group includes glycidyl group-containing monomers (e.g. glycidyl acrylate, glycidyl methacrylate), N-methylol or alkoxy group-containing monomers such as methylol compounds (e.g. N-methylolacrylamide, N-methylolmethacrylamide) or alkyl ethers thereof (e.g. methyl ether, ethyl ether, or butyl ether of the methylol compounds), carboxyl group-containing monomers (e.g. acrylic acid, itaconic acid, maleic acid), or the like. The unsaturated monovinyl monomer may be copolymerized in an amount of 0.1 to 5% by weight based on the weight of the vinyl acetate-ethylene copolymer.

In order to obtain the desired copolymer containing less than 30% by weight of benzene-insoluble part, it is not preferable to use polybasic acid vinyl esters (e.g. divinyl succinate, divinyl adipate, divinyl ether, diallyl ether) or polyfunctional acid allyl esters (e.g. triallyl cyanurate, diallyl fumarate), which are usually used for the preparation of copolymers having three-dimensional structure. Moreover, it is not preferably to use a large amount of the partially hydrolyzed polyvinyl alcohol alone, as the nonionic dipersing agent, because the partially hydrolyzed polyvinyl alcohol tends to induce the graft reaction of vinyl acetate.

The preparation of the vinyl acetate-ethylene copolymer emulsion having an intrinsic viscosity of 0.4 to 1.4 dl/g may be carried out by a method wherein the polymerization temperature is raised, a method wherein the concentration of the polymerization catalyst is increased, or a method wherein a molecular weight regulating agent, i.e. a chain transfer agent, is used, but is preferably carried out by the method using a chain transfer agent.

The method wherein the polymerization temperature is raised is unfavorable as an industrial method, because the solubility of ethylene in vinyl acetate is decreased and hence a higher pressure is required to increase the ethylene content of the copolymer. Besides, according to the method using a high concentration of the polymerization catalyst, it is very difficult to control the polymerization temperature, and further the polymerization catalyst is contained in the resulting emulsion, which gives bad influence on the stability of the emulsion and causes inferior colorability and stability of the pressure-sensitive adhesive prepared therefrom.

The chain transfer agent includes the compounds as listed in Tables 14-19 in M. K. Lindemann: "Polymerization of Vinyl Acetate", issued on June 15, 1968 by Jugo Kenkyukai (Polymerization Research Association). Mercapto acids (e.g. thioglycolic acid, thioglycolic acid esters), aliphatic mercaptans (e.g. octylmercaptan, dodecylmercaptan) may also be used as the chain transfer agent.

The emulsion polymerization of the present invention is carried out in the presence of a polymerization catalyst, such as a water-soluble radical initiator which is usually used in the conventional emulsion polymerization, for instance, hydrogen peroxide, potassium persulfate, ammonium persulfate, which may be used alone or in the form of a redox catalyst, i.e. in a combination thereof with a reducing agent (e.g. l-ascorbic acid, Rongalite (i.e. sodium formaldehyde sulfoxylate), ferrous sulfate). The polymerization temperature is preferably in the range of 30 to 60° C. The polymerization pressure is preferably in the range of 30 to 100 kg/cm$^2$ in order to obtain the desired copolymer having an ethylene content of 15 to 40% by weight.

It is also preferable to add at least 50% by weight of the vinyl acetate monomer uniformly and continuously to the emulsion polymerization system during the emulsion polymerization reation. When half or more amount of the used vinyl acetate monomer is added before the initiation of the polymerization reaction or at the first stage of the reaction, it tends to produce a vinyl acetate-ethylene copolymer having disproportioned components, which gives bad influence on the water resistance and alkali resistance of the vinyl acetate-ethylene copolymer and further causes inferior adhesion stability at a moist atmosphere of the pressure-sensitive adhesive prepared therefrom.

The vinyl acetate-ethylene copolymer emulsion of the present invention has preferably a high content of the solid components, for instance, it contains not less than 45% by weight, more preferably not less than 50% by weight, of the solid components in order to use as a base material for a pressure-sensitive adhesive, because it has a small evaporation latent heat and hence the burden for drying thereof is small.

The vinyl acetate-ethylene copolymer emulsion of the present invention is incorporated in a pressure-sensitive adhesive composition as a base material therefor, optionally together with other emulsion, such as an acrylic emulsion. Optionally, other additives, such as a pressure-sensitive adhesive auxiliary (e.g. polyterpene, gum rosin, rosin esters, rosin derivatives, cumarone-indene resin, petroleum hydrocarbon resin, hydrogenated rosin), fillers, softening agents, or the like may be incorporated.

The vinyl acetate-ethylene copolymer emulsion of the present invention can give an improved pressure-sensitive adhesive, i.e. can eliminate the defect of the conventional pressure-sensitive adhesive containing an acrylic ester copolymer emulsion as the base material therefor which is inferior in the adhesion force to a base of polyolefinic resins such as polyethylene, polypropylene, polybutene resins. When the vinyl acetate-ethylene copolymer emulsion of the present invention is blended in an amount of 5 to 35 parts by weight, preferably 10 to 25 parts by weight (as the solid components) with 100 parts by weight (as the solid components) of an acrylic ester copolymer emulsion, the pressure-sensitive adhesive comprising the blend shows a highly improved adhesion properties to the polyolefinic resin base. Thus, the emulsion of the present invention is also useful for improving the properties of the conventional base material for a pressure-sensitive adhesive comprising an acrylic ester copolymer emulsion.

The acrylic ester copolymer emulsion means an emulsion of an acrylic ester copolymer having a glass transition point of from $-15°$ C. to $-75°$ C. and is prepared by polymerizing or copolymerizing at least one ester of an unsaturated carboxylic acid (e.g. acrylic acid, methacrylic acid, maleic acid, fumaric acid) wherein the ester moiety has 2 to 12 carbon atoms, to which a vinyl ester (e.g. vinyl acetate, vinyl propionate) and/or a vinyl monomer having a functional group (e.g. glycidyl group, carboxyl group, N-methylol group, alkoxy group, sulfonic group) may further be copolymerized.

The present invention is illustrated by the following Examples but is not limited thereto. In the Examples, "part" and "%" are "part by weight" and "% by weight", respectively, unless specified otherwise.

EXAMPLE 1

Into an autoclave are charged a dispersion of hydroxyethyl cellulose (ethylene oxide addition amount: about 2.5 by mol, 2.0 parts), polyoxyethylene nonylphenol ether (HLB: 18.5, 2.0 parts), polyoxyethylene nonylphenol ether (HLB: 14.3, 2.0 parts) and sodium acetate (0.01 part) in water (70 parts) and vinyl acetate monomer (30 parts). The mixture is heated to 50° C. with agitation and thereto is added ethylene until the pressure becomes 60 kg/cm$^2$.

To the mixture are continuously added a 10% Rongalite aqueous solution and a 3% aqueous solution of potassium persulfate containing 0.5% of sodium acetate to initiate the polymerization reaction. Simultaneously, vinyl acetate monomer (70 parts) which contains chloroform (0.5 part) as a chain transfer agent is uniformly and continuously added over a period of 5 hours. The mixture is polymerized for 6.5 hours. After checking that the unreacted monomers become less than 0.5 part, the reaction mixture is cooled to stop the polymerization reaction. The emulsion thus obtained contains 59.2% of solid components and 0.8% of benzene-insoluble part and has an ethylene content in the copolymer of 27% and an intrinsic viscosity of 0.9 dl/g (in benzene, at 30° C.).

EXAMPLES 2 AND 3

The above Example 1 is repeated except that chloroform is used in an amount of 0.2 part (in Example 2) or 1.0 part (in Example 3). The ethylene content, the benzene-insoluble part and the intrinsic viscosity of the emulsions thus obtained are shown in the following Table 1.

EXAMPLE 4

Into an autoclave are charged a dispersion of a partially hydrolyzed polyvinyl alcohol (hydrolyzation degree: 88 mol %, 1.0 part), polyoxylethylene nonylphenol ether (HLB: 18.5, 2.5 parts), polyoxyethylene nonylphenol ether (HLB: 14.3, 2.5 parts) and sodium acetate (0.01 part) in water (80 parts) and vinyl acetate monomer (27 parts). The mixture is heated to 50° C. with agitation, and thereto is added ethylene until the pressure becomes 60 kg/cm$^2$.

To the mixture are continuously added a 10% Rongalite aqueous solution and a 6% aqueous solution of ammonium persulfate containing 0.5% of sodium acetate to initiate the polymerization reaction. Simultaneously, vinyl acetate monomer (70 parts) which contains chloroform (0.5 part) as a chain transfer agent and a solution of N-methylolacrylamide (3 parts) in water (10 parts) are uniformly and continuously added over a period of 5 hours. The mixture is reacted for 7 hours. After checking that the unreacted monomers become less than 0.5 part, the reaction mixture is cooled to stop the polymerization reaction. The emulsion thus obtained contains 55.2% of solid components, and the copolymer has 12.2% of benzene-insoluble part, an intrinsic viscosity of 0.92 dl/g and an ethylene content of 28%.

REFERENCE EXAMPLES 1 TO 6

In a similar manner as described in Example 1 to 4, there are produced various vinyl acetate-ethylene copolymer emulsions having the ethylene content, benzene-insoluble part and intrinsic viscosity as shown in Table 1.

In Reference Example 5, a dispersing agent comprising polyoxyethylene nonylphenol ether (HLB: 18.3, 3.0 parts), polyoxyethylene nonylphenol ether (HLB: 14.3, 2.0 parts) and sodium vinylsulfonate (1.0 part) is used, and other ingredients and reaction conditions are the same as in Example 1.

In Reference Example 6, a partially hydrolyzed polyvinyl alcohol (hydrolyzation degree: 88 mol %, 4.0 parts) is used as the dispersing agent, and other ingredients and reaction conditions are the same as in Example 1.

The benzene-insoluble part in the copolymer emulsion and the intrinsic viscosity thereof in the above Examples and Reference Examples are measured as follows:

Benzene-insoluble part:

The copolymer (1 g) is dissolved in benzene (100 g) by heating at 70° C. for 3 hours, and the resulting solution is filted by a 300 mesh wire screen, and then the amount of the materials which do not pass through the screen is measured.

Intrinsic viscosity:

The viscosity of the benzene solution containing the benzene-soluble part which is filtered in the above procedure is measured with a conventional viscometer at 30° C. in the same manner as described on pages 308–314 of Principles of Polymer Chemistry by Paul J. Flory (Cornell University Press, 1969).

The emulsions obtained in the above Examples 1 to 4 and Reference Examples 1 to 6 are subjected to the following tests.

1. Test of tackiness

The emulsion is applied onto a polypropylene sheet to give a film having a thickness of 0.15 mm, which is tested in accordance with J. Dow's method [cf. Proc. Inst. Rubber Ind., Vol. 1, page 105 (1954)].

2. Test of adhesion force

The emulsion is applied onto a polypropylene sheet to give a film having a thickness of 0.15 mm, to which a polypropylene sheet is contact-laminated with a hand roller (weight: 1 kg). One hour after, the polypropylene sheet is peeled off by pulling it at an angle of 180° and then the peel strength is measured. Simultaneously, the state of the emulsion adhered onto the surface of the polypropylene sheet is observed.

3. Heat resistance (yellow discoloration)

The emulsion is applied onto a glass plate to give a film having a thickness of 0.15 mm, which is treated with heat at 150° C. for 10 minutes, and thereafter, the yellow discoloration of the film is observed.

The results are shown in the following Table 1.

Table 1

| Emulsion | Ethylene content (% by weight) | Benzene-insoluble part (% by weight) | Intrinsic viscosity (dl/g) | Tackiness (ball number) | Adhesion force (g/inch) | Adhered emulsion | Heat resistance (Yello discoloration) |
|---|---|---|---|---|---|---|---|
| Example 1 | 27 | 0.8 | 0.90 | 8 | 1070 | Not observed | Not observed |
| Example 2 | 27 | 0.5 | 1.21 | 7 | 980 | " | " |
| Example 3 | 27 | 0.6 | 0.62 | 8 | 1060 | " | " |
| Example 4 | 28 | 12.2 | 0.92 | 7 | 960 | " | " |
| Reference Example 1 | 27 | 0.6 | 1.60 | 3 | 340 | Not observed | Not observed |
| Reference Example 2 | 27 | 0.5 | 0.21 | 4 | 110 | Observed | " |
| Reference Example 3 | 10 | 1.5 | 0.60 | 4 | 100 | Not observed | " |
| Reference Example 4 | 45 | 2.2 | 0.64 | 4 | 320 | " | " |

Table 1-continued

| Emulsion | Ethylene content (% by weight) | Benzene-insoluble part (% by weight) | Intrinsic viscosity (dl/g) | Tackiness (ball number) | Adhesion force (g/inch) | Adhered emulsion | Heat resistance (Yello discoloration) |
|---|---|---|---|---|---|---|---|
| Reference Example 5 | 27 | 0.7 | 0.89 | 7 | 1000 | " | Observed |
| Reference Example 6 | 27 | 50.1 | 0.86 | 2 | 170 | " | Not observed |

EXAMPLE 5

Into an autoclave are charged a dispersion of hydroxyethyl cellulose (ethylene oxide addition amount: about 1.5 mol %, 1.5 parts), polyoxyethylene nonylphenol ether (HLB: 17.5, 2.5 parts), polyoxyethylene nonylphenol ether (HLB: 13.5, 2.5 parts) and sodium acetate (0.01 part in water (70 parts) and vinyl acetate monomer (20 parts) wherein thioglycolic acid (0.03 part) is dissolved. The mixture is heated to 50° C. with agitation, and thereto is added ethylene until the pressure becomes 60 kg/cm$^2$.

To the mixture are continuously added a 10% Rongalite aqueous solution and a 3% aqueous solution of potassium persulfate containing 0.5% of sodium acetate to initiate the polymerization reaction. Simultaneously, vinyl acetate monomer (80 parts) wherein thioglycolic acid (0.12 part) is dissolved is uniformly and continuously added over a period of 5 hours. The mixture is reacted for 7 hours. After checking that the unreacted monomers become less than 0.5%, the reaction mixture is cooled to stop the polymerization reaction. The emulsion thus obtained contains 56.2% of solid components, and the copolymer has an ethylene content of 26%, benzene-insoluble part of 0.3% and an intrinsic viscosity of 0.8 dl/g (in benzene, at 30° C.).

REFERENCE EXAMPLE 7

The above Example 5 is repeated except that no thioglycolic acid is used. The copolymer thus obtained has an ethylene content of 26.2%, benzene-insoluble part of 0.4% and an intrinsic biscosity of 1.8 dl/g (in benzene, at 30° C.).

REFERENCE EXAMPLE 8

The above Example 5 is repeated except that no thioglycolic acid is used and the polymerization pressure is 30 kg/cm$^2$. The copolymer thus obtained has an ethylene content of 10%, benzene-insoluble part of 0.3% and an intrinsic viscosity of 1.5 dl/g (in benzene, at 30° C.).

REFERENCE EXAMPLES 9 AND 10

The conventional acrylic ester copolymer emulsions comprising 2-ethylhexyl acrylate-vinyl acetate (70:30 by weight) copolymer and 2-ethylhexyl acrylate-ethyl acrylate (50:50 by weight) copolymer, respectively are used as a reference emulsion.

EXAMPLES 6 TO 8 AND REFERENCE EXAMPLES 11 TO 13

Blend emulsions are prepared by blending the vinyl acetate-ethylene copolymer emulsion of Example 5 or Reference Example 7, 8 or 9 and the acrylic ester copolymer emulsion of Reference Example 9 or 10 in the ratio as mentioned in the following Table 3, wherein the solid components in each emulsion are regulated so as to be 50%.

The emulsions of Example 5 and Reference Examples 3, 7 and 8 and the blend emulsions of Examples 6 to 8 and Reference Examples 11 to 13 are subjected to the tests of tackiness and adhesion force in the same manner as described above. The results are shown in Tables 2 and 3.

Table 2

| Emulsion | Ethylene content (% by weight) | Benzene-insoluble part (% by weight) | Intrinsic viscosity (dl/g) | Tackiness (ball number) | Adhesion force (g/inch) | Adhered emulsion |
|---|---|---|---|---|---|---|
| Example 5 | 26 | 0.3 | 0.80 | 8 | 420 | Not observed |
| Reference Example 3 | 10 | 1.5 | 0.60 | 4 | 152 | " |
| Reference Example 7 | 26.2 | 0.4 | 1.80 | 3 | 146 | " |
| Reference Example 8 | 10 | 0.3 | 1.50 | 2 | 130 | " |
| Reference Example 9 | 2-ethylhexyl acrylate-vinyl acetate (70:30 by weight) copolymer emulsion | | | 7 | 222 | Not observed |
| Reference Example 10 | 2-Ethylhexyl acrylate-ethyl acrylate (50:50 by weight) copolymer emulsion | | | 8 | 230 | " |

Table 3

| Blend emulsion | Vinyl acetate-ethylene copolymer emulsion | | Acrylic ester co-polymer emulsion | | Tackiness (ball numbers) | Adhesive force (g/inch) | Adhered emulsion |
| | Emulsion | Part by weight | Emulsion | part by weight | | | |
|---|---|---|---|---|---|---|---|
| Example 6 | Example 5 | 7 | Reference Example 9 | 93 | 8 | 360 | Not observed |
| Example 7 | Example 5 | 15 | Reference | 85 | 8 | 395 | " |
| Example 8 | Example 5 | 15 | Reference Example 10 | 85 | 8 | 375 | " |
| Reference | Reference | 15 | Reference | 85 | 7 | 211 | Not observed |

Table 3-continued

| Blend emulsion | Vinyl acetate-ethylene copolymer emulsion | | Acrylic ester co-polymer emulsion | | Tackiness (ball numbers) | Adhesive force (g/inch) | Adhered emulsion |
|---|---|---|---|---|---|---|---|
| | Emulsion | Part by weight | Emulsion | part by weight | | | |
| Example 11 | Example 7 | | Example 9 | | | | |
| Reference Example 12 | Reference Example 8 | 15 | Reference Example 9 | 85 | 7 | 202 | " |
| Reference Example 13 | Reference Example 9 | 15 | Reference Example 9 | 85 | 7 | 216 | " |

What is claimed is:

1. A pressure-sensitive adhesive containing a base material therefor comprising an aqueous emulsion of vinyl acetate-ethylene copolymer having an ethylene content of 20 to 35% by weight, the benzene-insoluble part of less than 20% by weight and an intrinsic viscosity of the benzene-soluble part of 0.6 to 1.0 dl/g (at 30° C.) which is prepared by the emulsion copolymerization of vinyl acetate monomer and ethylene monomer in the presence of 0.1 to 1% by weight of a protective colloid and 1 to 8% by weight of a polyoxyethylenic nonionic surfactant, based on the total weight of the monomers, at a temperature of 30–60° C. and under a pressure of 30 to 100 kg/cm$^2$, wherein at least 50% by weight of the vinyl acetate monomer is added uniformly and continuously to the emulsion polymerization system during the emulsion polymerization.

2. The pressure-sensitive adhesive according to claim 1, wherein the vinyl acetate-ethylene copolymer is a copolymer prepared by copolymerizing together with vinyl acetate and ethylene 0.1 to 5% by weight (based on the weight of the vinyl acetate-ethylene copolymer) of at least one unsaturated monovinyl monomer selected from the group consisting of an unsaturated monovinyl monomer having a glycidyl group, an unsaturated monovinyl monomer having an N-methylol or alkoxy group and an unsaturated monovinyl monomer having a carboxyl group.

3. The pressure-sensitive adhesive according to claim 1, wherein the base material for the pressure-sensitive adhesive comprises a blend of 5 to 35 parts by weight (as the solid component) of the vinyl acetate-ethylene copolymer emulsion as set forth in claim 1 and 100 parts by weight (as the solid component) of an emulsion of an acrylic ester copolymer.

4. The pressure-sensitive adhesive according to claim 1, wherein the base material for the pressure-sensitive adhesive comprises a blend of 10 to 25 parts by weight (as the solid component) of the vinyl acetate-ethylene copolymer emulsion as set forth in claim 1 and 100 parts by weight (as the solid component) of an emulsion of an acrylic ester copolymer.

5. The pressure-sensitive adhesive of claim 1, wherein the protective colloid is a nonionic water-soluble high molecular weight compound selected from the group consisting of a polyvinyl alcohol, a partially hydrolyzed polyvinyl alcohol having a saponification degree of at least 60 mole % and a degree of polymerization of 300 to 2,700, methyl cellulose, ethyl cellulose, hydroxyethyl cellulose, and carboxymethyl cellulose.

6. The pressure sensitive adhesive of claim 1, wherein the polyoxyethylenic nonionic surfactant is selected from the group consisting of polyoxyethylene lauryl ether, polyoxyethylene octylphenol ether, polyoxyethylene nonylphenol ether, polyoxyethylene sorbitan monolaurate, polyoxyethylene sorbitan monooleate and polyoxyethylene polyoxypropylene block copolymers having an ethylene oxide addition of 10 to 80 mol %.

* * * * *